(12) United States Patent
Bollineni et al.

(10) Patent No.: US 10,637,750 B1
(45) Date of Patent: Apr. 28, 2020

(54) DYNAMICALLY MODIFYING A SERVICE CHAIN BASED ON NETWORK TRAFFIC INFORMATION

(71) Applicant: Juniper Networks, Inc., Sunnyvale, CA (US)

(72) Inventors: Anil Kumar Bollineni, Sunnyvale, CA (US); Lei Wang, Beijing (CN); Juguang Huang, Beijing (CN); Ruiyan Shi, Beijing (CN); Wei Zhao, Beijing (CN)

(73) Assignee: Juniper Networks, Inc., Sunnyvale, CA (US)

( * ) Notice: Subject to any disclaimer, the term of this patent is extended or adjusted under 35 U.S.C. 154(b) by 120 days.

(21) Appl. No.: 15/787,230

(22) Filed: Oct. 18, 2017

(51) Int. Cl.
*H04L 12/26* (2006.01)
*H04L 12/851* (2013.01)
*H04L 29/08* (2006.01)
*H04L 12/853* (2013.01)
*H04L 12/24* (2006.01)

(52) U.S. Cl.
CPC ........ *H04L 43/024* (2013.01); *H04L 41/5025* (2013.01); *H04L 43/08* (2013.01); *H04L 47/2416* (2013.01); *H04L 47/2483* (2013.01); *H04L 67/101* (2013.01)

(58) Field of Classification Search
CPC ... H04L 67/101; H04L 47/2416; H04L 41/14; H04L 41/5025; H04L 47/2483; H04L 43/08; H04L 43/024; H04L 43/022
See application file for complete search history.

(56) References Cited

U.S. PATENT DOCUMENTS

| 2016/0179582 | A1* | 6/2016 | Skerry | G06F 9/5077 718/1 |
| 2017/0019335 | A1* | 1/2017 | Schultz | H04L 43/0876 |
| 2017/0099310 | A1* | 4/2017 | Di Pietro | H04L 63/1425 |
| 2018/0054384 | A1* | 2/2018 | Farmanbar | H04L 45/38 |
| 2019/0028347 | A1* | 1/2019 | Johnston | H04L 41/0823 |

* cited by examiner

*Primary Examiner* — Omer S Mian
(74) *Attorney, Agent, or Firm* — Harrity & Harrity, LLP

(57) ABSTRACT

A device may receive information associated with a service chain to be implemented in association with a flow. The information associated with the service chain may include a source network address associated with the flow, a destination network address associated with the flow, a set of protocols associated with the flow, and a set of network services, of the service chain, to be implemented in association with the flow. The device may implement the service chain in association with the flow. The device may receive network traffic information associated with the flow based on implementing the service chain in association with the flow. The device may modify the service chain based on the network traffic information associated with the flow to permit a modified service chain to be implemented in association with the flow.

20 Claims, 6 Drawing Sheets

US 10,637,750 B1

DYNAMICALLY MODIFYING A SERVICE CHAIN BASED ON NETWORK TRAFFIC INFORMATION

BACKGROUND

A set of network devices can implement a set of network services on network traffic associated with a flow. A service chain can refer to the set of network services that are applied, in a particular order, to the network traffic of the flow.

SUMMARY

According to some possible implementations, a device may include one or more processors to receive information associated with a service chain to be implemented in association with a flow, the information associated with the service chain including a source network address associated with the flow, a destination network address associated with the flow, a set of protocols associated with the flow, and a set of network services, of the service chain, to be implemented in association with the flow; implement the service chain in association with the flow based on receiving the information associated with the service chain to be implemented in association with the flow; receive network traffic information associated with the flow based on implementing the service chain in association with the flow; and modify the service chain based on the network traffic information associated with the flow to permit a modified service chain to be implemented in association with the flow.

According to some possible implementations, a non-transitory computer-readable medium may store one or more instructions, that when executed by one or more processors, cause the one or more processors to receive information associated with a service chain to be implemented in association with a flow, the information associated with the service chain including a source identifier associated with the flow, a destination identifier associated with the flow, a set of protocols associated with the flow, or a set of network services, of the service chain, to be implemented in association with the flow; cause a set of network devices to implement the service chain in association with the flow based on receiving the information associated with the service chain to be implemented in association with the flow; receive network traffic information associated with the flow based on implementing the service chain in association with the flow, the network traffic information being indicative of whether a security issue is associated with the flow; and modify the service chain based on the network traffic information associated with the flow to permit a modified service chain to be implemented in association with the flow.

According to some possible implementations, a method may include receiving, by a device, information associated with a service chain to be implemented in association with a flow, the information associated with the service chain including information that identifies the flow, and a set of network services, of the service chain, to be implemented in association with the flow; implementing, by the device, the service chain in association with the flow based on receiving the information associated with the service chain to be implemented in association with the flow; receiving, by the device, network traffic information associated with the flow based on implementing the service chain in association with the flow; modifying, by the device, the service chain, to form a modified service chain, based on the network traffic information associated with the flow; and implementing, by the device, the modified service chain in association with the flow.

DETAILED DESCRIPTION

Figure 1A:
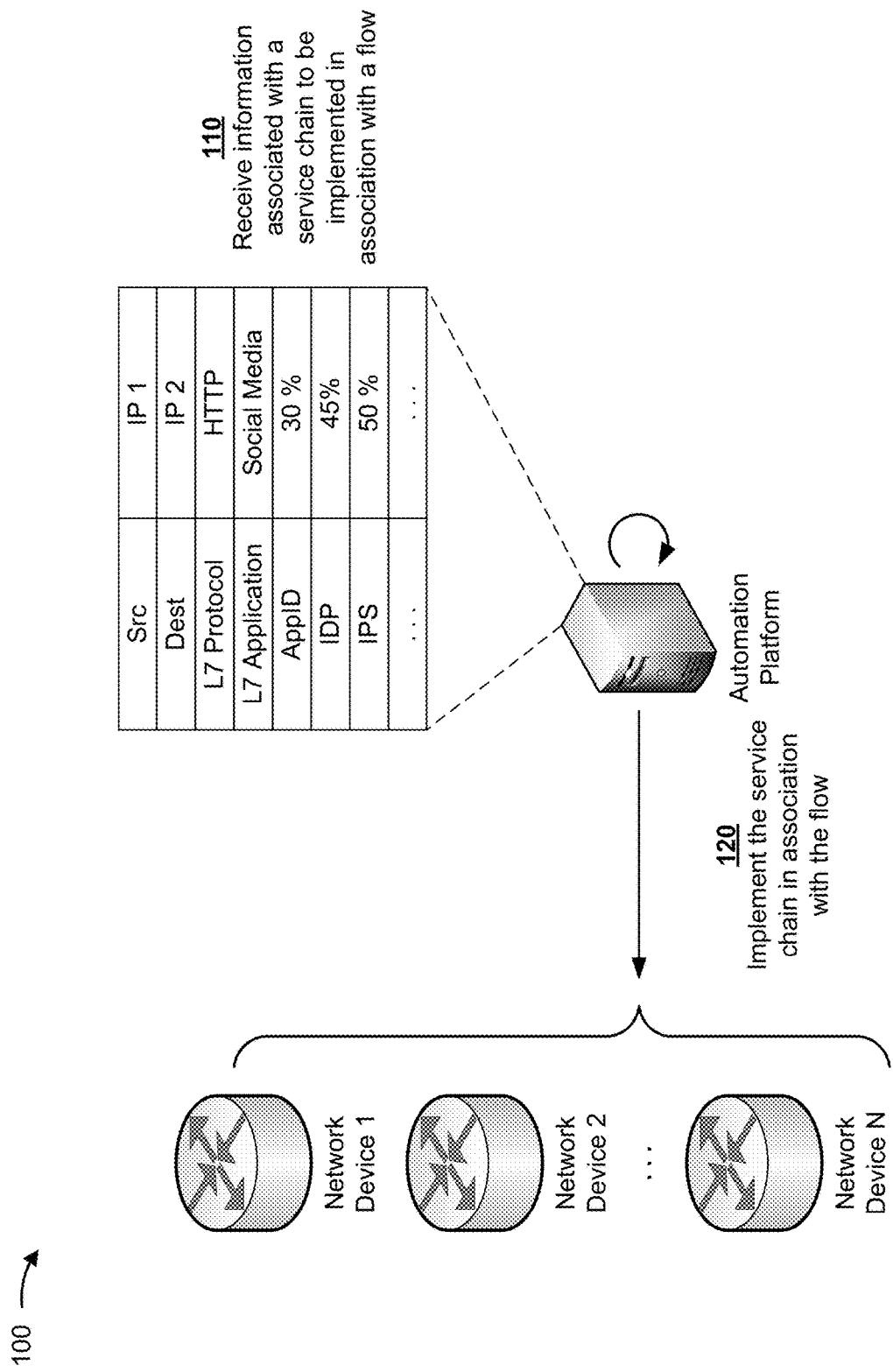
FIGS. 1A-1C are diagrams of an overview of an example implementation described herein.

The following detailed description of example implementations refers to the accompanying drawings. The same reference numbers in different drawings may identify the same or similar elements.

A network operator can configure a set of network devices to implement a set of network services on a flow (e.g., a sequence of packets that includes some common characteristics), such as an application identification (AppID) service, an intrusion detection and prevention (IDP) service, a uniform resource locator (URL) filtering service, a network address translation (NAT) service, an authentication service, a virtual private network (VPN) service, an application layer gateway (ALG) service, an intrusion prevention system (IPS) service, and/or the like.

Further, the network operator can configure a service chain, including the set of network services, that is to be applied to network traffic of a flow. In other words, a service chain can define a set of network services that is to be applied in a particular order on network traffic of a flow to provide a composite service for a flow.

In some cases, the network operator can configure traffic percentage rates of the respective network services of the service chain. A traffic percentage rate can identify an amount of network traffic on which a particular network service is implemented in relation to a total amount of network traffic that is received by a network device that is implementing the network service. For example, a traffic percentage rate of 50% indicates that a network service is to be implemented on half of the network traffic of the flow that is received by a network device.

In some cases, the network operator can configure the traffic percentage rates such that the network services are performed on a substantial percentage of network traffic of the flow (e.g., 60%, 70%, 80%, and/or the like, of network traffic associated with the flow). In this way, network security is improved because the network services are being implemented on a substantial portion of the network traffic of the flow, thereby increasing the likelihood of identifying potential security issues, such as malware, viruses, worms, Trojan horses, ransomware, spyware, and/or the like.

However, network services can be computationally expensive and can negatively affect network performance by increasing latency, reducing throughput, increasing delay, reducing bandwidth, and/or the like. Additionally, some flows might not pose a security threat, might include a lower likelihood of including security issues than as compared to other flows, and/or the like. If a large number of network services are performed on such flows and/or if the network services are configured with substantial traffic percentage rates, then computational resources are consumed and/or network performance is negatively affected. Further, manual configuration of service chains might prove impractical, time-consuming, error-prone, and/or the like.

Some implementations described herein provide an automation platform that may receive information associated with a service chain that is to be implemented in association with a flow, and automatically configure a set of network devices to implement the service chain.

Further, some implementations described herein permit the automation platform to receive network traffic information associated with the flow and use machine learning techniques to automatically modify the service chain based of the network traffic information. For example, the network traffic information may include information identifying whether the flow is associated with security issues, whether the flow poses a risk of including security issues, and/or the like.

In this way, some implementations described herein improve network security by increasing the number of network services that are implemented in association with flows that pose a higher security threat than other flows, and/or by increasing the amount of network traffic, of a flow, on which such network services are implemented.

Additionally, in this way, some implementations described herein improve network performance (e.g., reduce delay, increase bandwidth, increase throughput, and/or the like) by reducing a number of network services and/or by reducing an amount of network traffic on which such network services are implemented in situations where a flow poses a reduced security threat, has not included security issues, and/or the like.

Additionally, some implementations described herein reduce an amount of manual configuration of service chains, thereby reducing subjectivity of service chain configuration, errors associated with service chain configuration, inefficiencies associated with service chain configuration, and/or the like.

Put another way, some implementations described herein provide an automation platform that can dynamically modify a service chain (e.g., the number of network services, traffic percentage rates of the network services, and/or the like) based on the security threat of a particular flow. As compared to static service chain configurations, some implementations described herein improve network security, reduce an amount of manual configuration, improve network performance, conserve device resources, conserve network resources, reduce error, and/or the like.

Figure 1B:
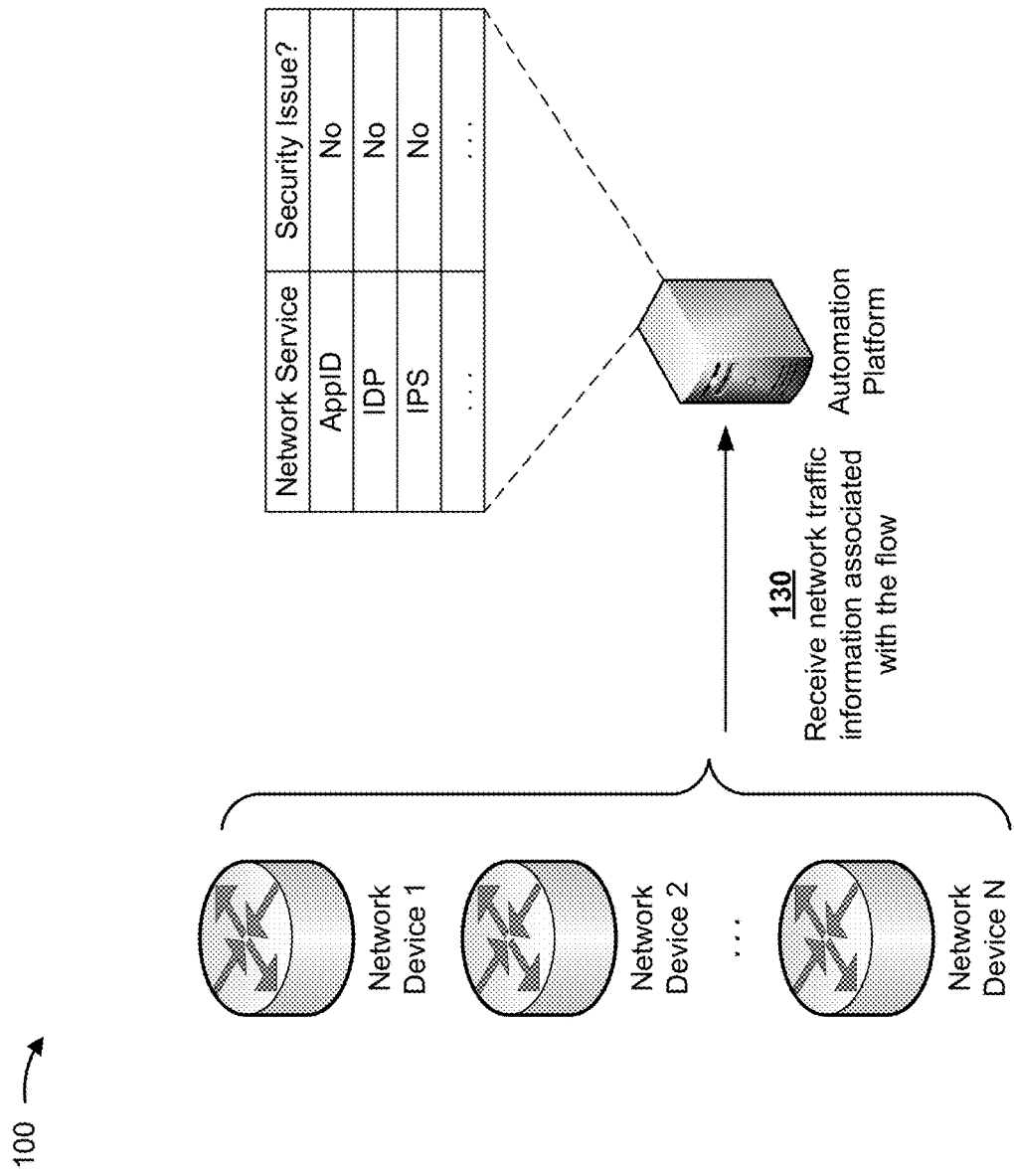
Figure 1C:
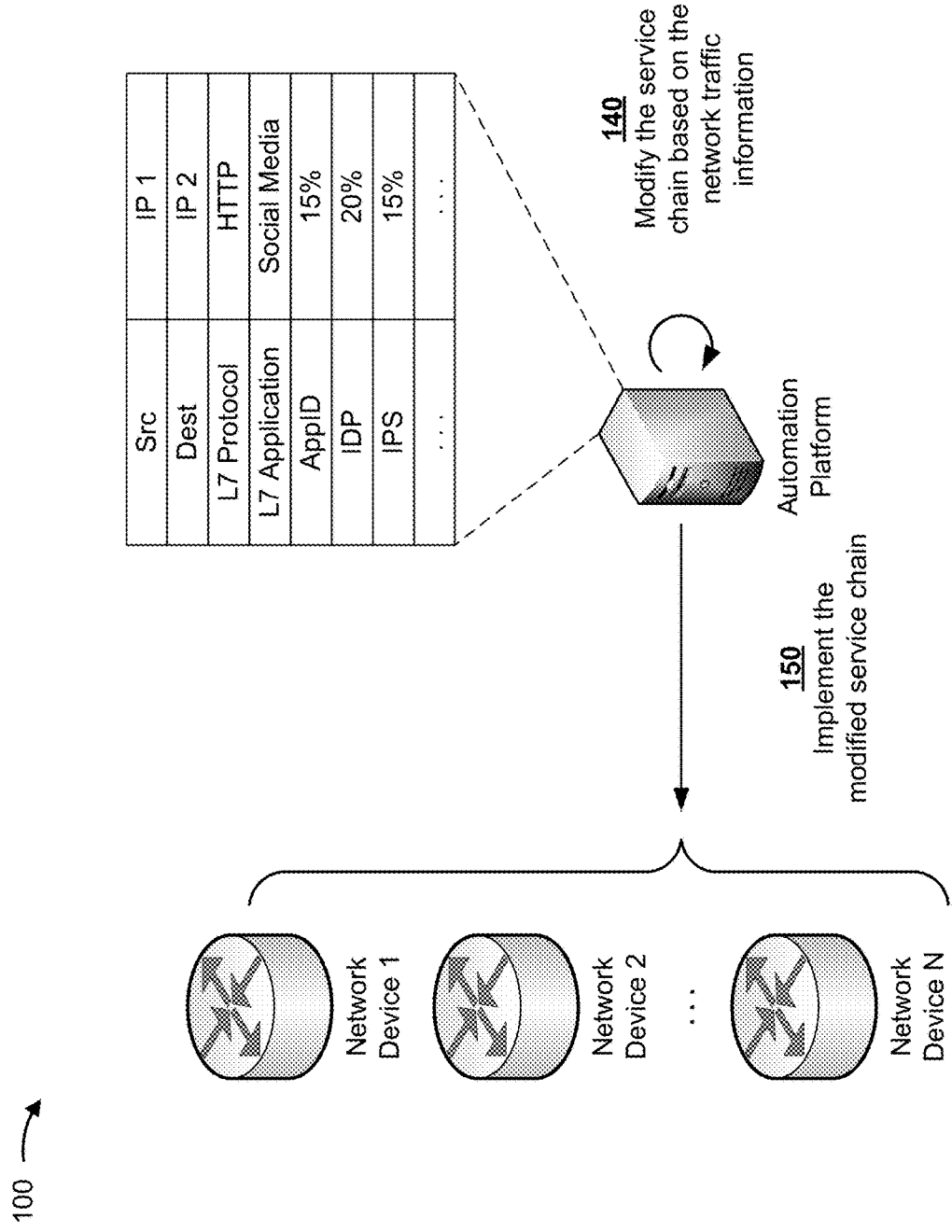

FIGS. 1A-1C are diagrams of an overview of an example implementation 100 described herein. As shown in FIG. 1A, example implementation 100 may include an automation platform and a set of network devices. As shown by reference number 110, the automation platform may receive information associated with a service chain to be implemented in association with a flow.

For example, the automation platform may receive, from another device (e.g., which may have received an input from a network operator), information that identifies the flow (e.g., five-tuple information, such as a source address, a destination address, a source port identifier, a destination port identifier, and a protocol identifier), information that identifies a layer 7 (e.g., layer 7 of the open systems interconnection (OSI) model) protocol associated with the flow (e.g., hypertext transfer protocol (HTTP)), and information that identifies a layer 7 application associated with the flow (e.g., a social media application).

Additionally, as shown, the automation platform may receive information that identifies a set of network services (e.g., an application identification (AppID) service, an intrusion detection and prevention (IDP) service, an intrusion prevention system (IPS) service, a unified threat monitoring (UTM) service, an advances malware detection service, and/or the like) that is to be implemented in association with the flow as part of the service chain.

Additionally, as shown, the automation platform may receive information that identifies respective traffic percentage rates associated with the network services (e.g., a traffic percentage rate of 30% for the AppID service, a traffic percentage rate of 45% for the IDP service, a traffic percentage rate of 50% for the IPS service, a traffic percentage rate of 20% for the UTM service, a traffic percentage rate of 10% for the advanced malware detection service, and/or the like).

As further shown in FIG. 1A, and by reference number 120, the automation platform may implement the service chain in association with the flow. For example, the automation platform may generate configuration information using the information associated with the service chain. Additionally, the automation platform may provide, to the set of network devices, the configuration information to permit the set of network devices to implement the service chain in association with the flow.

While a single flow is shown in association with FIGS. 1A-1C, it should be understood that, in practice, the automation platform may receive information associated with millions, billions, trillions, etc. of flows. Thus, some implementations described herein permit a substantial number of service chains to be modified in association with the flows, whereas manual modification of such a substantial number of service chains might be impossible, impractical, error-prone, subjective, etc.

As shown in FIG. 1B, and by reference number 130, the automation platform may receive network traffic information associated with the flow. In some implementations, the network traffic information may include information that identifies a network service implemented on the flow, whether a security issue was identified in association with the flow, a quantity of bytes transferred, a number of packets transferred, a period of time of the flow (e.g., a duration of the flow), a time frame (e.g., a time, a day of the week, a season, and/or the like), a network metric value associated with the flow (e.g., a throughput value, a delay value, a latency value, a bandwidth value, and/or the like), and/or the like.

For example, the network devices may provide, to the automation platform, the network traffic information after implementing the service chain in association with the flow. As shown, the automation platform may identify, based on the network traffic information, that the AppID service, the IDP service, and the IPS service, the UTM service, the advanced malware detection service, respectively, did not identify security issues associated with network traffic of the flow.

As shown in FIG. 1C, and by reference number 140, the automation platform may modify the service chain based on the network traffic information. For example, as shown, the automation platform may modify the service chain by modifying the traffic percentage rates associated with the network services. In other words, the automation platform may reduce a traffic percentage rate associated with the AppID service from 30% to 15%, may reduce a traffic percentage rate associated with the IDP service from 45% to 20%, and may reduce a traffic percentage rate of the IPS service from 50% to 15% based on not identifying security issues associated with network traffic of the flow.

As further shown in FIG. 1C, and by reference number 150, the automation platform may implement the modified service chain. For example, the automation platform may provide configuration information to the set of network devices that permits the set of network devices to implement the modified service chain.

By reducing the traffic percentage rates of the network services, some implementations described herein may improve network performance, may conserve network resources, and/or may conserve processor and/or memory resources of network devices that are executing computationally expensive application layer services.

In other cases, the network devices, implementing the network services of the service chain, might identify security issues with the network traffic. In such cases, the automation platform might receive network traffic information identifying the security issues, and may increase traffic percentage rates associated with the network services to improve network security.

As such, it should be understood that the automation platform may dynamically modify a service chain (e.g., adjust traffic percentage rates of network services, add additional network services to the service chain, remove network services from the service chain, and/or the like) based on network traffic information provided by the network devices that are implementing the service chain. In this way, some implementations described herein offer improved performance as compared to static configurations and/or policies associated with service chains.

As indicated above, FIGS. 1A-1C are provided merely as an example. Other examples are possible and may differ from what was described with regard to FIGS. 1A-1C.

Figure 2:
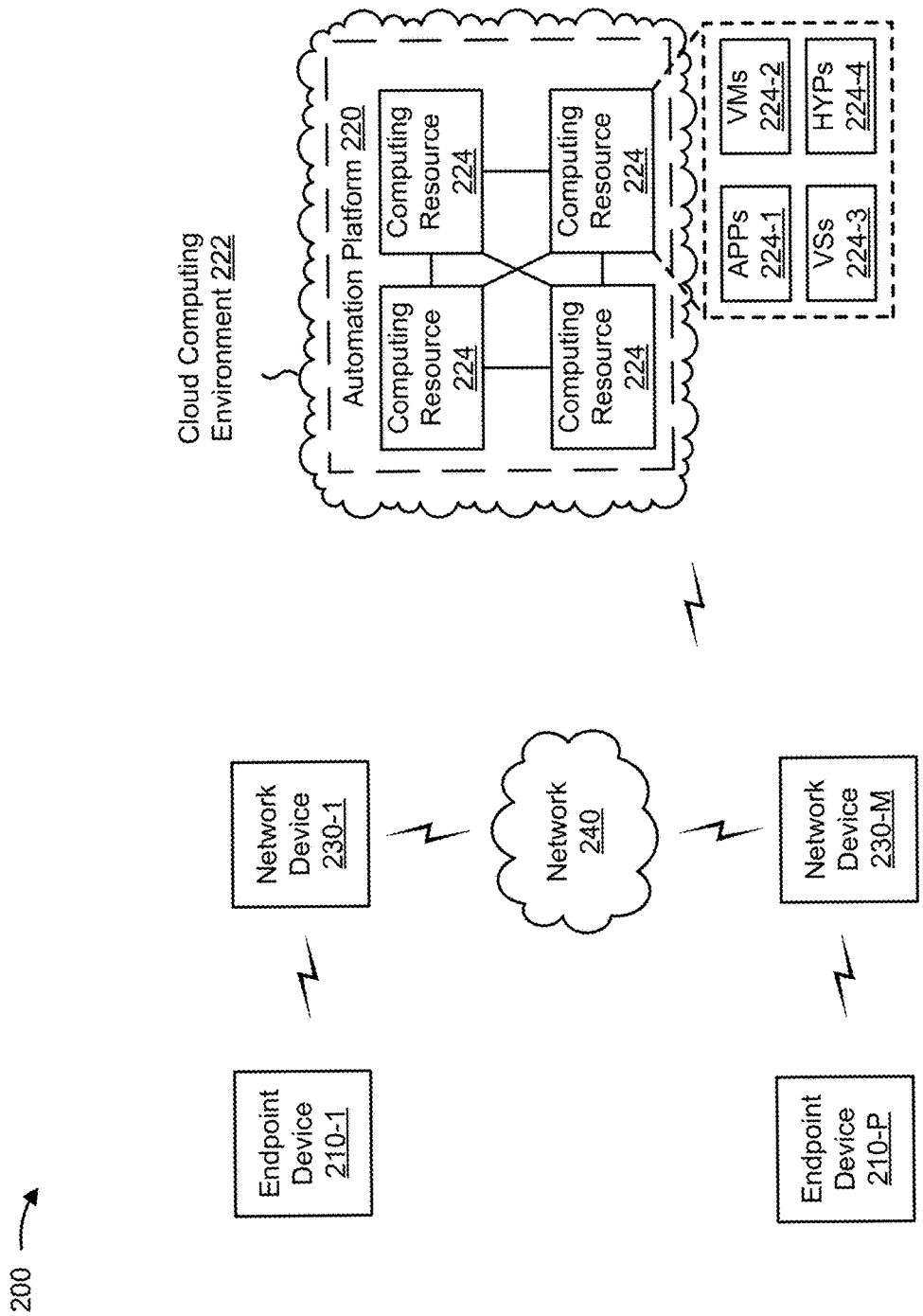
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more endpoint devices 210-1 through 210-P (P≥1) (hereinafter referred to collectively as "endpoint devices 210," and individually as "endpoint device 210"), an automation platform 220, one or more network devices 230-1 through 230-M (M≥1) (hereinafter referred to collectively as "network devices 230," and individually as "network device 230"), and a network 240. Devices of environment 200 may interconnect via wired connections, wireless connections, or a combination of wired and wireless connections.

Endpoint device 210 includes or more devices capable of providing and/or receiving network traffic (e.g., packets). For example, endpoint device 210 may include a user device, a server device, an endpoint device, an edge device, or another device that can be a source or a destination of network traffic. In some implementations, endpoint device 210 may provide network traffic via a session, such as a transmission control protocol (TCP) session. For example, a first endpoint device 210 may transmit network traffic to a second endpoint device 210 via a TCP session that includes a set of network traffic transactions. A transaction may include a particular file being transmitted via a session, such as an audio video file, a video file, a multimedia file, a database file, or the like.

Automation platform 220 includes one or more devices capable of dynamically modifying service chains. In some implementations, automation platform 220 may be designed to be modular such that certain software components may be swapped in or out depending on a particular need. As such, automation platform 220 may be easily and/or quickly reconfigured for different uses.

In some implementations, as shown, automation platform 220 may be hosted in cloud computing environment 222. Notably, while implementations described herein describe automation platform 220 as being hosted in cloud computing environment 222, in some implementations, automation platform 220 might not be cloud-based (i.e., may be implemented outside of a cloud computing environment) or may be partially cloud-based.

Cloud computing environment 222 includes an environment that hosts automation platform 220. Cloud computing environment 222 may provide computation, software, data access, storage, etc. services that do not require end-user knowledge of a physical location and configuration of system(s) and/or device(s) that hosts automation platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host automation platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, or the like.

Application 224-1 includes one or more software applications that may be provided to or accessed by network device 230. Application 224-1 may eliminate a need to install and execute the software applications on network devices 230. For example, application 224-1 may include software associated with automation platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network device 230 includes one or more devices capable of processing and transferring network traffic between a first endpoint device 210 and a second endpoint device 210. For example, network device 230 may include a router, a gateway, a switch, a firewall, a hub, a bridge, a reverse proxy, a server (e.g., a proxy server, a server executing a virtual machine, etc.), a security device, an intrusion detection device, a load balancer, a line card (e.g., in a chassis-based system), or a similar type of device. In some implementations, network device 230 may be a physical device implemented within a housing, such as a chassis. In some implementations, network device 230 may be a virtual device implemented by one or more computer devices of a cloud computing environment or a data center.

Network 240 includes one or more wired and/or wireless networks. For example, network 240 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, an Ethernet virtual private network (EVPN), or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
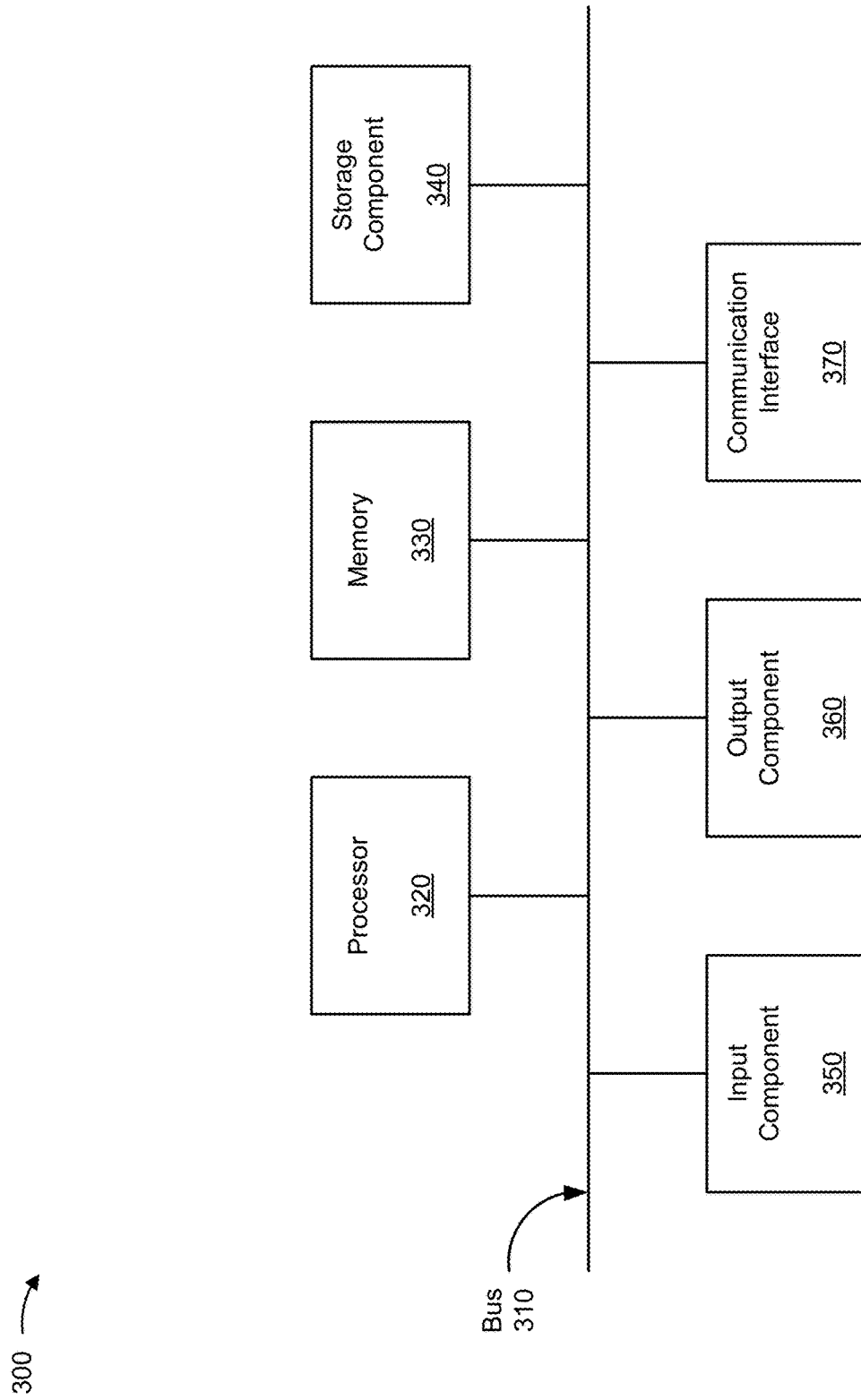
FIG. 3 is a diagram of example components of one or more devices of FIG. 2.

FIG. 3 is a diagram of example components of a device 300. Device 300 may correspond to endpoint device 210, automation platform 220, and/or network device 230. In some implementations, endpoint device 210, automation platform 220, and/or network device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
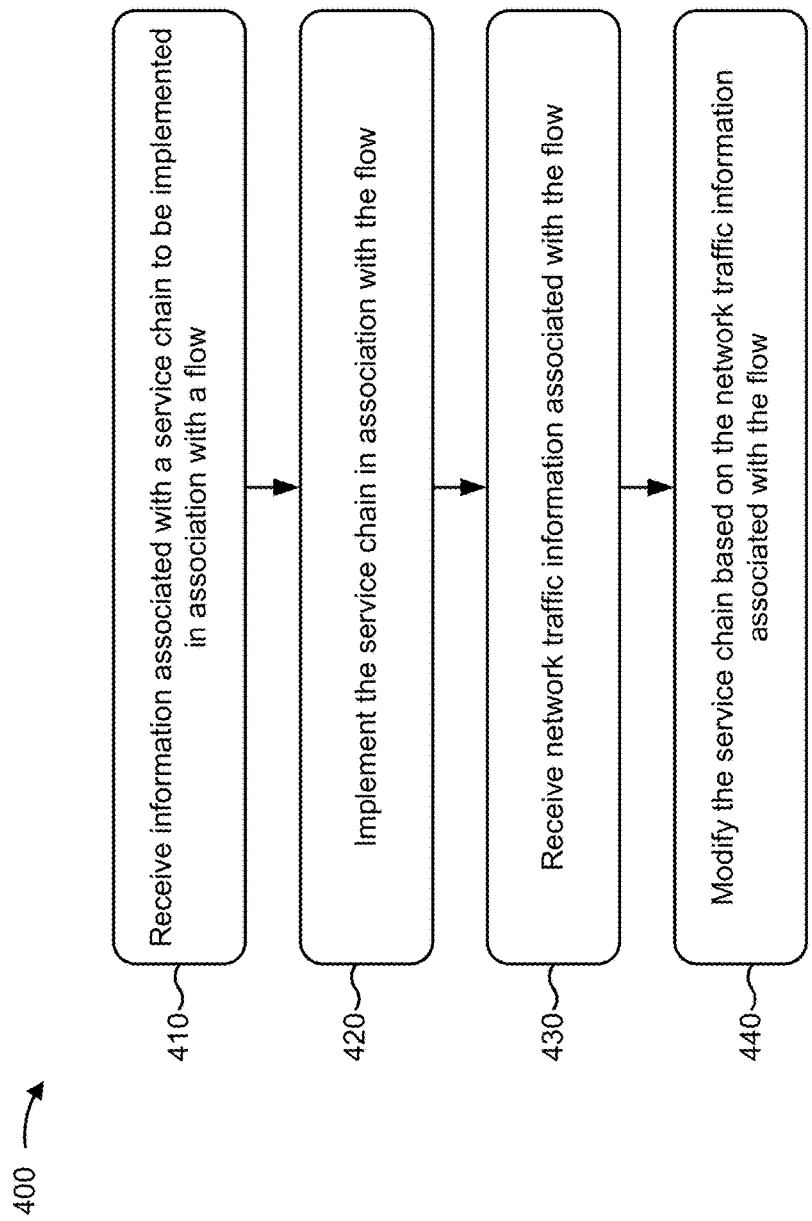
FIG. 4 is a flow chart of an example process for dynamically modifying a service chain based on network traffic information.

FIG. 4 is a flow chart of an example process 400 for dynamically modifying a service chain based on network traffic information. In some implementations, one or more process blocks of FIG. 4 may be performed by automation platform 220. In some implementations, one or more process blocks of FIG. 4 may be performed by another device or a group of devices separate from or including automation platform 220, such as endpoint device 210 and/or network device 230.

As shown in FIG. 4, process 400 may include receiving information associated with a service chain to be implemented in association with a flow (block 410). For example, automation platform 220 may receive information associated with a service chain that is to be implemented in association with a flow transferred between a first endpoint device 210 and a second endpoint device 210.

In some implementations, a service chain may refer to a set of network services that is to be applied to network traffic associated with a flow. For example, the service chain may include a set of network services and/or features, implemented by a set of network devices 230, on network traffic associated with a flow. As examples, a network service may include an application identification (AppID) service, an intrusion detection and prevention (IDP) service, a uniform resource locator (URL) filtering service, a network address translation (NAT) service, an authentication service, a virtual private network (VPN) service, an application layer gateway (ALG) service, an intrusion prevention system (IPS) service, a content filtering service, a content inspection service, a payload inspection service, an anti-virus service, an anti-malware service, a geolocation Internet protocol (GeoIP) service, a security intelligence (SecIntel) service, a quality of service (QoS) service, an application firewall (AppFW) service, a unified threat management (UTM) service, an encryption service, a decryption service, a deep packet inspection (DPI) service, and/or the like.

As used herein, a packet may refer to a communication structure for communicating information, such as a protocol data unit (PDU), a network packet, a datagram, a segment, a block, a cell, a frame, a subframe, a slot, a symbol, a portion of any of the above, and/or another type of formatted or unformatted unit of data capable of being transmitted via a network.

As used herein, a flow may refer to a sequence of packets that share common information, such as five-tuple information (e.g., a source address, a destination address, a source port identifier, a destination port identifier, and a protocol identifier).

As used herein, the information associated with the service chain that is to be implemented in association with the flow may be referred to as "service chain information." While implementations herein describe automation platform 220 receiving service chain information associated with a particular flow, it should be understood that, in practice, automation platform 220 may receive service chain information associated with thousands, millions, billions, etc. of flows. As such, automation platform 220 may permit a substantial number of service chains to be dynamically modified for a substantial number of flows, whereas manual configuration of such service chains might otherwise be impossible, subjective, and/or impractical.

In some implementations, automation platform 220 may receive, from another device (e.g., which may have received an input from a network operator), the service chain information. Additionally, or alternatively, automation platform 220 may receive information that identifies a memory location at which the service chain information is stored, and may retrieve the service chain information. In some implementations, the service chain information may include a set of data, a set of files, a set of messages, and/or the like.

In some implementations, automation platform 220 may receive the service chain information based on an input from another device, based on a time frame (e.g., periodically), based on an event, based on being powered on, and/or the like.

In some implementations, the service chain information may identify the flow to which the service chain is to be applied. For example, the service chain information may include five-tuple information associated with the flow on which the service chain is to be implemented.

In some implementations, the service chain information may identify various protocols associated with the Open Systems Interconnection (OSI) model (or another type of communications model). For example, the service chain information may identify a layer 3 protocol associated with the flow (e.g., Internet Protocol (IP), datagram delivery protocol (DDP), routing information protocol (RIP), and/or the like), a layer 4 protocol associated with the flow (e.g., transmission control protocol (TCP), user datagram protocol (UDP), quick UDP Internet connection (QUIC) protocol, and/or the like), a layer 5 protocol (e.g., real-time transport control protocol (RTCP), short message peer-to-peer (SMPP) protocol, zone information protocol (ZIP), and/or the like), and/or a layer 6 protocol (e.g., multipurpose Internet mail extensions (MIME) protocol, external data representation (XDR) protocol, lightweight presentation protocol (LPP), and/or the like).

In some implementations, the service chain information may identify a layer 7 protocol (e.g., an application layer protocol, such as hypertext transfer protocol (HTTP), HTTP secure (HTTPs), simple mail transfer protocol (SMTP), file transfer protocol (FTP), real time streaming protocol (RTSP), and/or the like). Additionally, or alternatively, the service chain information may identify a layer 7 application (e.g., an application layer application, such as a multimedia application, an email application, a peer-to-peer application, a remote-access application, a social-networking application, a web application, a gaming application, a messaging application, and/or the like). Additionally, or alternatively, the service chain information may identify a particular layer 7 application (e.g., Facebook) and/or a group to which the particular layer 7 application belongs (e.g., social-networking applications).

In some implementations, the service chain information may identify a set of network services that is to be implemented in association with the flow and/or that is capable of being implemented in association with the flow. For example, the service chain information may identify one or more network services as described elsewhere herein (e.g., an AppID service, an IPS service, a SecIntel service, and/or the like). Additionally, or alternatively, the service chain information may identify a temporal order in which the network services are to be implemented in association with the flow (e.g., an AppID service first, an IPS service second, a SecIntel service third, etc.).

In some implementations, the service chain information may identify a respective traffic percentage rate of each network service of the set of network services. In some implementations, a traffic percentage rate may identify an amount of network traffic on which a network service is to be implemented in relation to a total amount of network traffic associated with the flow. As a particular example, a traffic percentage rate of 0.001, 0.1%, 1/1000, and/or the like, may identify that a network service is to be implemented on one packet per every one thousand packets that are received by network device(s) 230. As another example, a traffic percentage rate of 1 or 100% may identify that the network service is to be implemented on every packet that is received by network device(s) 230. As yet another example, a traffic percentage rate of 0 or 0% may identify that a particular network service is not to be implemented in association with the flow.

In some implementations, the service chain information may identify a set of network devices 230 that is to implement the service chain. For example, the service chain information may include device identifiers of network devices 230, network addresses of network devices 230, and/or the like.

In this way, automation platform 220 may receive the service chain information, and may implement the service chain in association with the flow, as described below. By receiving various parameters of the flow, such as five-tuple information and various protocols (e.g., a layer 3 protocol, a layer 4 protocol, a layer 5 protocol, a layer 6 protocol, a layer 7 protocol, a layer 7 application, and/or the like), automation platform 220 may implement a service chain in association with a flow in a more granular manner than as compared to situations where a service chain is implemented on flows based on fewer parameters (e.g., solely on five-tuple information, and/or the like).

As further shown in FIG. 4, process 400 may include implementing the service chain in association with the flow (block 420). For example, automation platform 220 may implement the service chain in association with the flow by configuring the set of network devices 230 to implement the service chain.

In some implementations, automation platform 220 may configure a set of network devices 230 to implement the service chain. In some implementations, automation platform 220 may receive network topology information and configure the set of network devices 230 based on the network topology information. For example, automation platform 220 may receive the network topology information from an element management system (EMS) that has access to the network topology. Additionally, or alternatively, automation platform 220 may receive or retrieve the network topology information using a network access control (NAC) protocol.

In some implementations, the network topology information may include information that identifies network devices 230 (e.g., device identifiers, network addresses, and/or the like), communication links between network devices 230, physical locations of network devices 230 (e.g., geographical location, site location, rack and/chassis location, and/or the like), port and/or socket information of communication links between network devices 230, paths associated with network 240, and/or the like.

Additionally, or alternatively, the network topology information may include information that identifies types of network devices 230, communication protocols of network devices 230, capabilities of network devices 230 (e.g., security capabilities, network services provided by network devices 230, and/or the like), resource utilization of network devices 230, configuration of network devices 230, and/or the like.

In some implementations, automation platform 220 may use the network topology information and the service chain information to identify a set of network devices 230 that is to implement the service chain. For example, automation platform 220 may identify, using the service chain information, the set of network services that is to be implemented, and may, using the network topology information, identify the set of network devices 230 that is to implement the network services of the service chain.

In some implementations, automation platform 220 may generate configuration information that permits network devices 230 to implement the service chain. For example, the configuration information may include information that permits a network device 230 to implement a network service of the service chain. As an example, assume that a network service includes a firewall service. In this case, the configuration information may include information that identifies an action that is to be performed in association with network traffic of the flow, such as permit, filter, deny, log, quarantine, redirect, rate limit, prioritize, and/or the like.

In some implementations, automation platform 220 may access a set of templates, and generate the configuration information based on the set of templates. For example, automation platform 220 may modify a template using the service chain information, and generate the configuration information based on modifying the template. In some implementations, automation platform 220 may identify a template that is particular to a particular network device 230, and use the template when generating configuration information for the particular network device 230.

In some implementations, automation platform 220 may provide, to the set of network devices 230, respective configuration information, such that the set of network devices 230 may implement the service chain. In this way, automation platform 220 may automatically configure network devices 230 based on the service chain information and/or network topology information. Thereby, some implementations described herein reduce an amount of manual configuration of network devices 230 to implement service chains.

In some implementations, the set of network devices 230 may receive the configuration information, and implement the service chain based on the configuration information. In other words, the set of network devices 230 may perform respective network services, of the set of network services, to implement the service chain. In some implementations, the set of network devices 230 may implement the service chain such that each network service is implemented in association with a configured traffic percentage rate. In other words, various network services, of the set of network services, might include different traffic percentage rates.

As an example, a particular network device 230 may implement a particular network service, and may perform the network service on network traffic of the flow according to a configured traffic percentage rate. Continuing the example, assume that a particular network device 230 is implementing an AppID service according to a traffic percentage rate of 30%. In this case, the particular network device 230 may perform the AppID service on 30% of the network traffic of the flow that is received by the particular network device 230.

In some implementation, the set of network devices 230 may use a tunneling technique, such as an IP tunneling technique, a generic route encapsulation (GRE) tunneling technique, a label switching technique, and/or the like, to implement the service chain. In other words, the set of network devices 230 may implement a technique to permit network traffic of the flow to traverse each network device 230 of the service chain.

It should be understood that the service chain may be implemented by a single network device 230 that is capable of performing each network service of the set of network services, or by multiple network devices 230 that perform one or more network services of the set of network services.

In this way, automation platform 220 may implement the service chain, and may receive network traffic information associated with the flow after implementing the service chain, as described below.

As further shown in FIG. 4, process 400 may include receiving network traffic information associated with the flow (block 430). For example, automation platform 220 may receive network traffic information, associated with the flow, based on the set of network devices 230 implementing the service chain in association with the flow.

In some implementations, network devices 230 may provide respective network traffic information to automation platform 220. For example, the network traffic information may include information collected by respective network devices 230 that are implementing the service chain. In some implementations, automation platform 220 may receive the network traffic information based on a time frame, based on providing a request for the network traffic information, based on an input from another device, based on a security issue being identified, and/or the like.

In some implementations, the network traffic information may include information that identifies a network service implemented on the flow, whether a security issue was identified in association with the flow, a quantity of bytes transferred, a number of packets transferred, a period of time of the flow (e.g., a duration of the flow), a time frame (e.g., a time, a day of the week, a season, and/or the like), a network metric value associated with the flow (e.g., a throughput value, a delay value, a latency value, a bandwidth value, and/or the like), and/or the like.

As used herein, a security issue may refer to code that is capable of negatively impacting a device. For example, a security issue may refer to malware, a virus, a worm, a Trojan horse, ransomware, spyware, and/or the like.

In some implementations, automation platform 220 may receive the network traffic information from an external data source (e.g., an external data base, a client device, a server, and/or the like). Additionally, or alternatively, the network traffic information may identify a security indicator associated with the flow. For example, a security indicator may include a score, a designation, a value, and/or the like that is indicative of a security issue, a risk, a threat, a reputation, a level of trust, and/or the like. As an example, a low security indicator may be indicative of a low security risk, a low threat, a high level of trust, and/or the like. As another example, a high security indicator may be indicative of a high security risk, a high threat, a low level of trust, and/or the like.

In this way, automation platform 220 may receive the network traffic information associated with the flow, and may dynamically modify the service chain based on the network traffic information associated with the flow, as described below.

As further shown in FIG. 4, process 400 may include modifying the service chain based on the network traffic information associated with the flow (block 440). For example, automation platform 220 may modify the set of network services, of the service chain, based on the network traffic information.

In some implementations, automation platform 220 may modify the service chain by modifying the number of network services associated with the service chain. For example, automation platform 220 may add additional network services to the service chain, or may remove network services from the service chain. As an example, assume that a security issue was identified in association with the flow, that the flow is associated with a high security indicator, and/or the like. In this case, automation platform 220 may identify additional network services to be added to the service chain to improve network security. As another example, assume that a security issue was not identified, that the flow is associated with a low security indicator, and/or the like. In this case, automation platform 220 may remove particular network services from the service chain to improve network performance and/or conserve processor and/or memory resources of network devices 230.

In some implementations, automation platform 220 may modify the service chain by modifying an action, a firewall rule, and/or the like, to be performed in association with the flow. For example, automation platform 220 may modify an action from "permit" to "deny" in the event that a security issue is identified in association with the flow.

In some implementations, automation platform 220 may modify the service chain by modifying a number of network devices 230 that are implementing a particular network service of the service chain. For example, automation platform 220 may scale up or scale down a particular network service by increasing or reducing a number of network devices 230 that are implementing the network service, respectively.

In some implementations, automation platform 220 may modify the service chain by adjusting a traffic percentage rate associated with a network service. For example, assume that a network service is associated with a traffic percentage rate of 50%. In this case, the network service may be implemented on 50% of the network traffic associated with the flow that traverses a network device 230 that is implementing the network service. Additionally, assume that the network traffic information indicates that the flow has not been associated with a security issue, is associated with a low security indicator, and/or the like. In this case, automation platform 220 may reduce a traffic percentage rate (e.g., from 50% to 30%) of the network service to improve network performance (e.g., reduce latency, increase throughput, and/or the like), and/or conserve processor and/or memory resources of network devices 230.

As another example, assume that the flow is associated with a security issue, is associated with a security indicator that identifies that the flow poses an elevated risk as compared to a previous security indicator, and/or the like. In this case, automation platform 220 may increase a traffic percentage rate of a network service (e.g., from 50% to 75%) to improve network security.

In some implementations, automation platform 220 may modify the service chain based on a model. In some implementations, automation platform 220 may use machine learning techniques to analyze data (e.g., training data, such as historical data, etc.) and train models. The machine learning techniques may include, for example, supervised and/or unsupervised techniques, such as artificial networks, Bayesian statistics, learning automata, Hidden Markov Modeling, linear classifiers, quadratic classifiers, decision trees, association rule learning, and/or the like. In some implementations, automation platform 220 may use another kind of computer-implemented technique, such as artificial intelligence, machine perception, or computer vision, to analyze network traffic information and modify the service chain.

In some implementations, automation platform 220 may train the model using millions, billions, trillions, etc. of data items. As such, automation platform 220 may use a big data technique to train the model as such a large volume of data cannot be processed objectively by a human operator. In some implementations, automation platform 220 may receive a model from another device, and use the model (e.g., without having trained the model).

In some implementations, automation platform 220 may input a set of parameter values associated with the network traffic information into a model, and modify the service chain based on an output of the model. For example, the set of parameter values may include values associated with the any of the network traffic information described above in connection with block 430. In some implementations, automation platform 220 may use an output of the model to determine a network service to be implemented in association with the service chain and/or a traffic percentage rate of a network service associated with the service chain.

By using network traffic information, automation platform 220 may dynamically modify a service chain that is to be implemented in association with a flow based on whether the flow poses a security risk, has posed a security risk, and/or the like. In other words, automation platform 220 may increase a number of network services and/or traffic percentage rates of the network services in the situation where a flow poses a security risk, and/or may reduce a number of network services and/or traffic percentage rates of the network services in the situation where a flow does not pose a security risk.

Thereby, some implementations described herein improve network security in situations where a number of network services is increased and/or traffic percentage rates of the network services are increased. Additionally, some implementations described herein improve network performance, conserve network resources, and/or conserve processor and/or memory resources of network devices 230 in situations where a number of network services is reduced, and/or traffic percentage rates of the network services are reduced.

In some implementations, automation platform 220 may generate configuration information and provide the configuration information to the set of network devices 230 to permit the set of network devices 230 to implement the modified service chain. For example, automation platform 220 may perform similar operations as described above in connection with block 420.

In some implementations, automation platform 220 may iteratively perform operations associated with blocks 420 through 440. In this way, automation platform 220 may dynamically modify a service chain based on network traffic information associated with the flow. In other words, automation platform 220 may modify a service chain such that network performance is improved while network security is maintained.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:
1. A device, comprising:
a memory; and
one or more processors to:
   receive first information associated with a service chain to be implemented in association with a flow,
      the first information associated with the service chain including:
         a source network address associated with the flow,
         a destination network address associated with the flow,
         a set of protocols associated with the flow, and
         a set of network services, of the service chain, to be implemented in association with the flow;
   receive second information identifying respective traffic percentage rates associated with the set of network services,
      each of the respective traffic percentage rates identifying an amount of network traffic on which a particular network service, of the set of network services, is implemented as a percentage of a total amount of network traffic received by a network device associated with the particular network service;

implement the service chain based on receiving the first information and the second information;

receive network traffic information associated with the flow based on implementing the service chain;

determine, based on the network traffic information, whether a security issue is identified in association with the flow; and selectively modify, based on determining whether the security issue is identified in association with the flow, the service chain by selectively modifying the respective traffic percentage rates associated with the set of network services, at least two of the respective traffic percentage rates being reduced by a different respective amount if the security issue is not identified in association with the flow, and at least two of the respective traffic percentage rates being increased by a different respective amount if the security issue is identified in association with the flow.

2. The device of claim 1, where the one or more processors, when modifying the service chain, are further to:

modify the service chain by modifying a number of network services, of the set of network services, associated with the flow.

3. The device of claim 1, where the one or more processors, when modifying the service chain, are to:

modify the service chain by modifying a number of network devices that are implementing one or more network services of the set of network services.

4. The device of claim 1, where the one or more processors are further to:

determine a set of network metric values associated with the flow; and where the one or more processors, when modifying the service chain, are to:

modify the service chain based on the set of network metric values.

5. A non-transitory computer-readable medium storing instructions, the instructions comprising:

one or more instructions that, when executed by one or more processors, cause the one or more processors to:

receive first information associated with a service chain to be implemented in association with a flow, the first information associated with the service chain including:

a source identifier associated with the flow, a destination identifier associated with the flow, a set of protocols associated with the flow, or a set of network services, of the service chain, to be implemented in association with the flow;

receive second information identifying respective traffic percentage rates associated with the set of network services, each of the respective traffic percentage rates identifying an amount of network traffic on which a particular network service, of the set of network services, is implemented as a percentage of a total amount of network traffic received by a network device associated with the particular network service;

cause a set of network devices to implement the service chain based on receiving the first information and the second information, the set of network devices including the network device;

receive network traffic information associated with the flow based on implementing the service chain, the network traffic information being indicative of whether a security issue is associated with the flow;

determine, based on the network traffic information, whether the security issue is identified in association with the flow; and selectively modify, based on determining whether the security issue is identified in association with the flow, the service chain by selectively modifying the respective traffic percentage rates associated with the set of network services, at least two of the respective traffic percentage rates being reduced by a different respective amount if the security issue is not identified in association with the flow, and at least two of the respective traffic percentage rates being increased by a different respective amount if the security issue is identified in association with the flow.

6. The non-transitory computer-readable medium of claim 5, where the first information associated with the service chain identifies an application layer protocol, of a communications model, of the flow.

7. The non-transitory computer-readable medium of claim 5, where the first information associated with the service chain identifies an application layer application, of a communications model, of the flow.

8. The non-transitory computer-readable medium of claim 5, where the one or more instructions, when executed by the one or more processors, further cause the one or more processors to:

receive network topology information; and where the one or more instructions, that cause the one or more processors to cause the set of network devices to implement the service chain, cause the one or more processors to:

cause the set of network devices to implement the service chain based on the network topology information.

9. The non-transitory computer-readable medium of claim 5, where the one or more instructions, when executed by the one or more processors, further cause the one or more processors to:

generate configuration information for the set of network devices based on the service chain; and provide, to the set of network devices, the configuration information based on generating the configuration information; and where the one or more instructions, that cause the one or more processors to cause the set of network devices to implement the service chain, cause the one or more processors to:

cause the set of network devices to implement the service chain based on providing, to the set of network devices, the configuration information.

10. The non-transitory computer-readable medium of claim 5, where the one or more instructions, when executed by the one or more processors, further cause the one or more processors to:

input a set of parameter values, associated with the network traffic information, into a model; and identify an output of the model based on inputting the set of parameter values; and where the one or more instructions, that cause the one or more processors to modify the service chain, cause the one or more processors to:
modify the service chain based on the output of the model.

11. A method, comprising:
receiving, by a device, first information associated with a service chain to be implemented in association with a flow,
the first information associated with the service chain including:
information that identifies the flow, and
a set of network services, of the service chain, to be implemented in association with the flow;
receiving, by the device, second information identifying respective traffic percentage rates associated with the set of network services,
each of the respective traffic percentage rates identifying an amount of network traffic on which a particular network service, of the set of network services, is implemented as a percentage of a total amount of network traffic received by a network device associated with the particular network service;
implementing, by the device, the service chain based on receiving the first information and the second information;
receiving, by the device, network traffic information associated with the flow based on implementing the service chain;
determining, by the device and based on the network traffic information, whether a security issue is identified in association with the flow;
selectively modifying, by the device and based on determining whether the security issue is identified in association with the flow, the service chain, to form a modified service chain, by selectively modifying the respective traffic percentage rates associated with the set of network services,
at least two of the respective traffic percentage rates being reduced by a different respective amount if determining that the security issue is not identified in association with the flow, and
at least two of the respective traffic percentage rates being increased by a respective different amount if the security issue is not identified in association with the flow; and
implementing, by the device, the modified service chain.

12. The method of claim 11, further comprising:
modifying a number of network services, of the set of network services, that are to be implemented in association with the flow; and
where modifying the service chain further comprises:
modifying the service chain by modifying a number of network services, of the set of network services, that are to be implemented in association with the flow.

13. The method of claim 11, further comprising:
receiving network topology information associated with a set of network devices; and
where implementing the service chain comprises:
implementing the service chain based on the network topology information associated with the set of network devices.

14. The device of claim 1, where the set of network services are to be implemented in a particular order.

15. The device of claim 1, where the security issue includes at least one of:
malware,
a virus,
a worm,
a trojan horse,
ransomware, or
spyware.

16. The method of claim 11, wherein modifying the service chain further comprises:
modifying the service chain by modifying a permission of an action to be performed in association with the flow.

17. The non-transitory computer-readable medium of claim 5, wherein the one or more instructions, that cause the one or more processors to modify the service chain, cause the one or more processors to:
modify the service chain by adding one or more network services to the service chain.

18. The non-transitory computer-readable medium of claim 5, wherein the one or more instructions, that cause the one or more processors to modify the service chain, cause the one or more processors to:
modify the service chain by removing one or more network services of the set of network services from the service chain.

19. The method of claim 11, wherein modifying the service chain comprises:
modifying the service chain by removing one or more network services of the set of network services from the service chain.

20. The method of claim 11, wherein modifying the service chain comprises:
modifying the service chain by adding one or more network services to the service chain.

* * * * *